(12) United States Patent
Fu et al.

(10) Patent No.: US 8,104,612 B2
(45) Date of Patent: *Jan. 31, 2012

(54) SLEEVES AND ALBUM PAGES FOR FLAT ITEMS

(75) Inventors: David Fu, Diamond Bar, CA (US); Robert D. Shipp, Bel-Air, CA (US)

(73) Assignee: Ultra Pro Corporation, City of Commerce, CA (US)

( * ) Notice: Subject to any disclaimer, the term of this patent is extended or adjusted under 35 U.S.C. 154(b) by 1323 days.

This patent is subject to a terminal disclaimer.

(21) Appl. No.: 10/897,505

(22) Filed: Jul. 22, 2004

(65) Prior Publication Data

US 2005/0072692 A1 Apr. 7, 2005

(51) Int. Cl.
*B65D 85/57* (2006.01)
(52) U.S. Cl. .................... 206/232; 206/312; 206/455
(58) Field of Classification Search .............. 206/308.1, 206/232, 484, 484.2, 312, 313, 311, 455
See application file for complete search history.

(56) References Cited

U.S. PATENT DOCUMENTS

| | | |
|---|---|---|
| 875,545 A | 12/1907 | MacDonald |
| 1,360,836 A | 11/1920 | Wasisco |
| 1,691,049 A | 11/1928 | Douglas |
| 1,889,420 A | 11/1932 | Rubicam, Jr. |
| 1,988,998 A | 1/1935 | Cornish |
| 2,093,160 A | 9/1937 | Steinthal |
| D137,732 S | 4/1944 | Mitchell |
| 2,421,503 A | 6/1947 | Hermon |
| 2,621,785 A | 12/1952 | De Pace |
| 2,986,144 A * | 5/1961 | Shepard ................. 40/404 |
| 3,091,046 A | 5/1963 | Engelstein et al. |
| 3,112,966 A | 12/1963 | Reid |
| 3,245,166 A | 4/1966 | Hagner |
| 3,555,713 A | 1/1971 | Leinbach |
| 3,596,393 A | 8/1971 | Lithgow |
| 3,651,591 A | 3/1972 | Woodyard |
| 3,956,836 A | 5/1976 | Seaborn |
| 4,247,999 A | 2/1981 | Latino |
| 4,356,649 A | 11/1982 | Diamond et al. |
| 4,405,228 A | 9/1983 | Muscoplat |
| 4,447,973 A | 5/1984 | Wihlke |
| 4,458,435 A | 7/1984 | Ackerman |
| 4,468,053 A | 8/1984 | Bradley |
| D282,856 S | 3/1986 | Daly |
| 4,640,413 A | 2/1987 | Kaplan et al. |
| 4,850,731 A | 7/1989 | Youngs |
| 4,907,904 A | 3/1990 | Baldwin |
| 4,965,948 A | 10/1990 | Ruebens |
| 4,974,983 A * | 12/1990 | Givati .................. 402/80 R |
| D321,007 S | 10/1991 | Barrick |
| 5,062,570 A | 11/1991 | Ashby |
| 5,147,036 A * | 9/1992 | Jacobs .................. 206/232 |
| 5,301,445 A | 4/1994 | Hoffmeister |

(Continued)

FOREIGN PATENT DOCUMENTS

DE 534428 9/1931

(Continued)

*Primary Examiner* — Jacob K Ackun, Jr.
(74) *Attorney, Agent, or Firm* — Holland & Hart LLP

(57) ABSTRACT

Sleeve and album page devices for holding flat items, in particular a compact disc such as a photo compact disc together with an associated index print, the preferred embodiment including an embedded synthetic paper strip with an exposed write-on area for identifying the subject matter of the compact disc.

18 Claims, 5 Drawing Sheets

U.S. PATENT DOCUMENTS

| | | |
|---|---|---|
| 5,312,507 A | 5/1994 | Miller |
| D347,994 S | 6/1994 | Hammond |
| 5,389,437 A | 2/1995 | Miyajima et al. |
| 5,396,987 A | 3/1995 | Temple et al. |
| 5,411,134 A | 5/1995 | Temple et al. |
| 5,431,449 A | 7/1995 | Arimoto et al. |
| D360,800 S | 8/1995 | Temple et al. |
| 5,462,160 A | 10/1995 | Youngs |
| 5,556,683 A | 9/1996 | Ranalli |
| 5,595,798 A | 1/1997 | Miller |
| D381,947 S | 8/1997 | Bergh et al. |
| 5,713,683 A | 2/1998 | Bergh et al. |
| 5,762,246 A | 6/1998 | Drew |
| 5,772,019 A * | 6/1998 | Reed .................. 206/308.1 |
| D403,915 S | 1/1999 | Temple et al. |
| 5,882,038 A | 3/1999 | Ong |
| 6,065,599 A | 5/2000 | Lincoln |
| D434,262 S | 11/2000 | Bergh et al. |
| 6,186,320 B1 | 2/2001 | Drew |
| 6,202,839 B1 * | 3/2001 | Petersen et al. ............ 206/308.1 |
| 6,241,086 B1 | 6/2001 | Bergh et al. |
| 6,247,587 B1 | 6/2001 | Yu |
| 6,266,907 B1 | 7/2001 | Matteau et al. |
| 6,267,234 B1 | 7/2001 | Bergh et al. |
| 6,309,987 B1 | 10/2001 | Srinivasan |
| 6,349,822 B1 * | 2/2002 | Greene .................. 206/308.1 |
| 6,415,976 B1 | 7/2002 | Flynn et al. |
| 6,714,209 B2 | 3/2004 | Van Valer |

FOREIGN PATENT DOCUMENTS

| | | |
|---|---|---|
| FR | 332929 | 11/1903 |
| GB | 11790 | 0/1894 |
| GB | 29275 | 0/1897 |

* cited by examiner

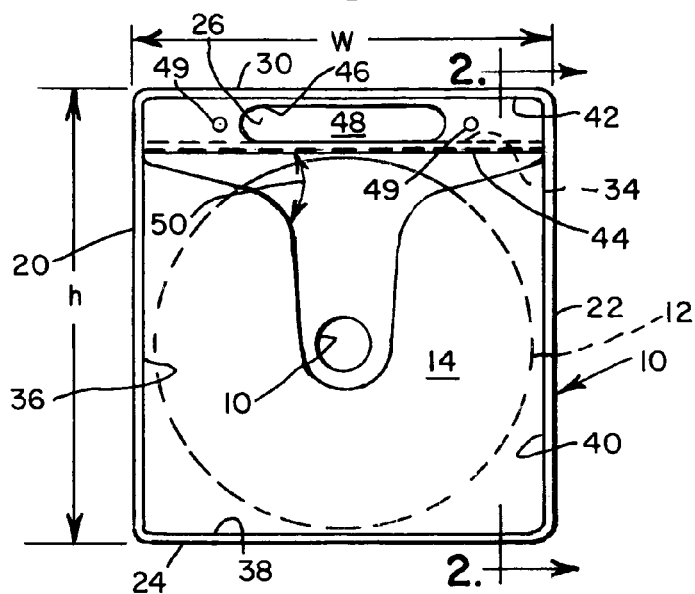
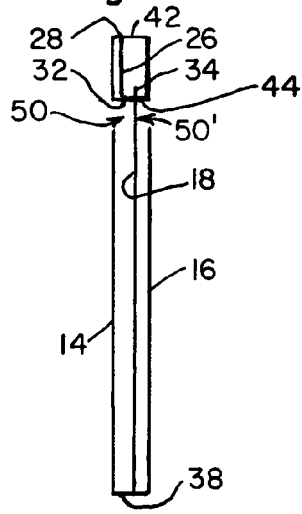
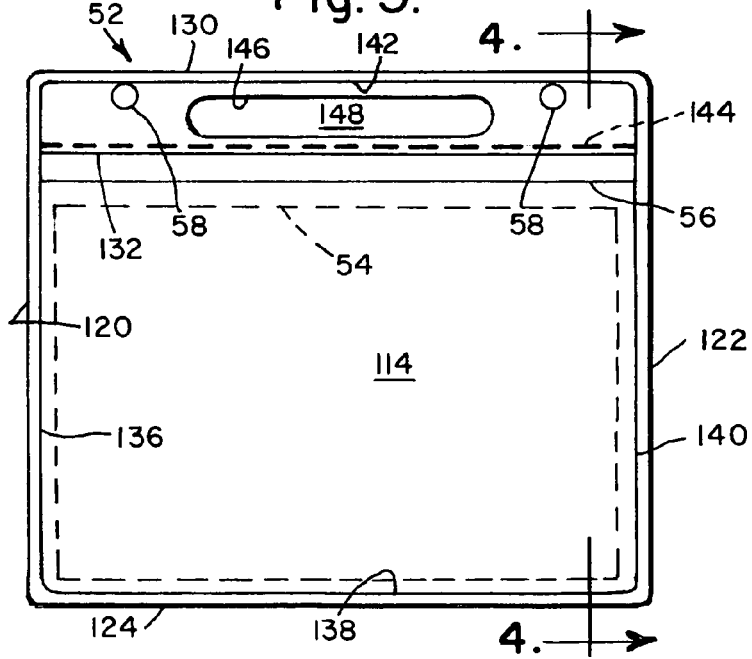
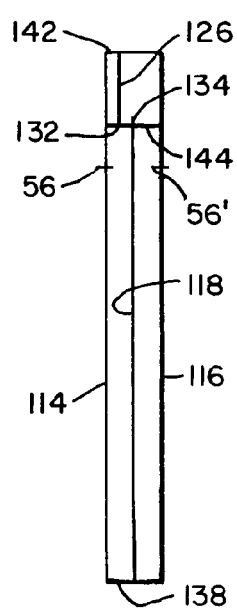

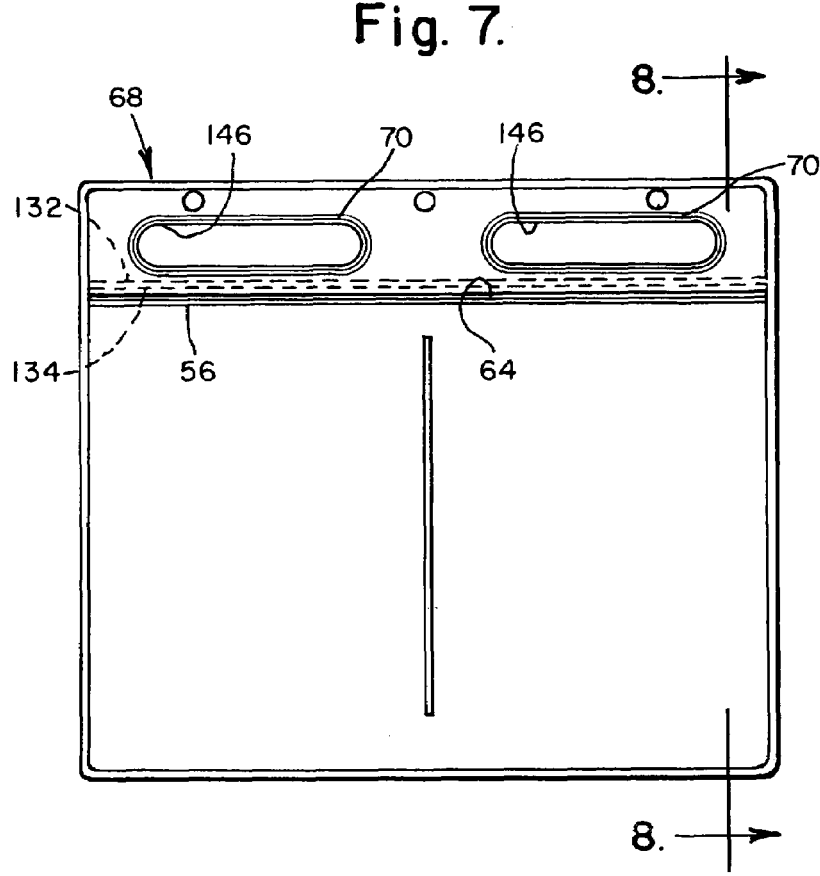
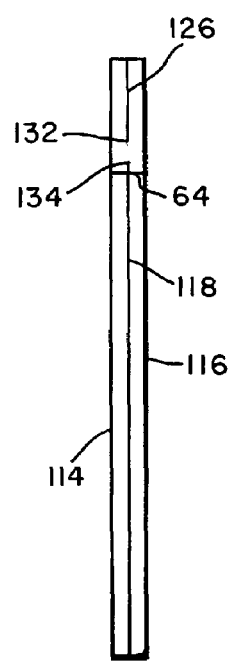

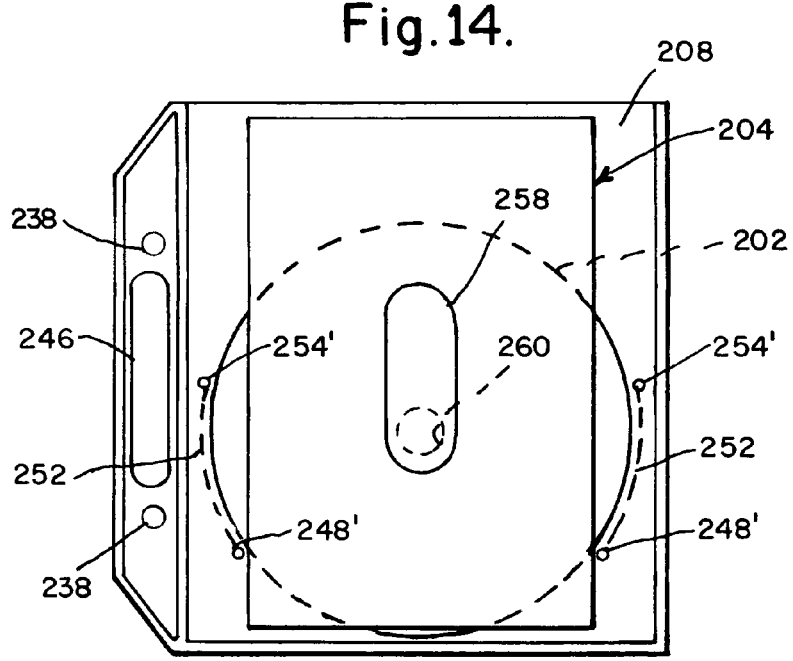
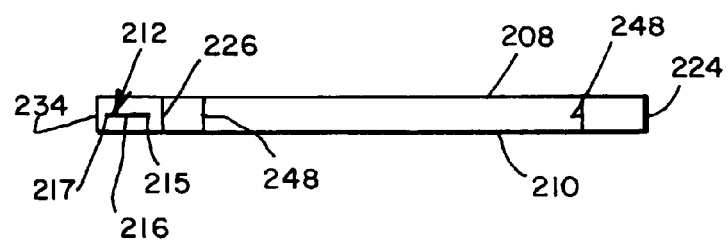
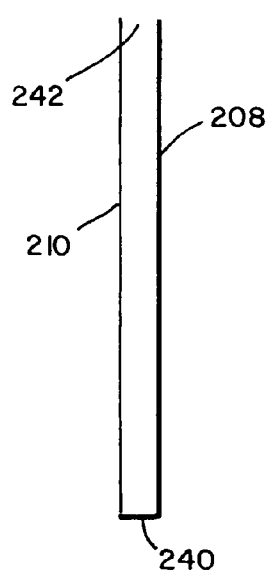

SLEEVES AND ALBUM PAGES FOR FLAT ITEMS

BACKGROUND OF THE INVENTION

This invention relates to sleeves and album pages for holding flat items such as compact discs and/or photographs, including such sleeves and pages including a write-on capability, and more particularly to such sleeves and pages for containing together such items as a compact disc and an associated index print.

Flexible plastic sleeves for holding a compact disc (or CD) are well known, as are flexible plastic album pages for holding photographs as well as CDs. Such sleeves and pages may be conventionally constructed of two or more rectangular superposed transparent flexible plastic sheets heat welded together along their edges and having an opening in one or both of the outermost sheets, creating a pocket into which the CD or photograph may be inserted through the opening.

Examples of such CD sleeves and album pages are disclosed in U.S. Pat. No. 6,186,320, to Terrence M. Drew, in which a sheet of heat weldable non-woven material is positioned between two transparent thermoplastic sheets, and the three superposed sheets are heat welded along their edges. An opening in each of the two outer sheets permits entry of a CD into a pocket between each transparent plastic sheet and the non-woven material. U.S. Pat. No. 6,186,320 is incorporated herein by reference.

A write-on capability may be provided for the sleeve or page. For example, U.S. Pat. No. 5,396,987, to James M. Temple et al., discloses a CD sleeve having two spaced-apart openings along the sleeve's top edge section for removably inserting an elongated alphanumeric/graphic card identifying a CD to be inserted into the pocket; U.S. Pat. No. 5,396,987 is incorporated herein by reference. Such insertable title strip appears to be shown also in FIG. 4 of the aforementioned Drew U.S. Pat. No. 6,186,320. U.S. Pat. Des. 434,262 to James A. Bergh et al., appears to show two write-on strips respectively overlying both sides of the top edge section of a CD sleeve and secured thereto.

SUMMARY OF THE INVENTION

The preferred embodiment of the invention disclosed in U.S. patent application Ser. No. 10/267,155 (now U.S. Pat. No. 6,796,426, to David Fu and Robert D. Shipp, assigned to the assignee of the present application), provides a strip of a weldable synthetic paper, having a write-on capability, welded between the two outer flexible thermoplastic sheets of a double-sided sleeve or album page, each of the outer sheets being provided with a window exposing an area on each side of the strip for permitting access to a person for writing on the exposed area of the strip. The structure of the sleeve provides a lightweight, non-bulky double-sided sleeve with a permanently captive synthetic paper strip having exposed write-on areas in positional association with the respective pockets for permitting notation concerning the temporal contents of each such pocket. The portions of the outer sheets covering the unexposed areas of the strip protect such unexposed areas from damage and soilage.

According to one aspect of that invention, a sleeve is provided for holding flat items such as compact discs and photographs, comprising in combination: a flexible first sheet, a flexible second sheet, and a flexible third sheet interposed between the first and second sheets, the first, second and third sheets welded together to form a pocket between the first and third sheets including an opening in the first sheet for receiving a flat item, and to form a pocket between the second and third sheets including an opening in the second sheet for receiving a flat item; a synthetic paper strip interposed between and welded to the first and second sheets; a window through the first sheet exposing an area of the synthetic paper strip; and a window through the second sheet exposing an area of the synthetic paper strip. The three sheets and the synthetic paper strip are preferably of heat-weldable plastic, and the third sheet is preferably of a weldable, non-laminated, non-woven material.

The windows afford access to the exposed areas of the synthetic paper strip for being written upon, such as for identifying a flat item such as a compact disc or photograph which may be contained in the associated pocket. The windows are preferably in superposed relation, and the synthetic paper strip may be welded to the first and second sheets along the superposed windows.

The dimensions of the first sheet of the sleeve are substantially the same as the dimensions of the second sheet, while the third sheet has a height dimension less than the height dimension of the first sheet. The third sheet is welded along its top edge to and between the first and second sheets, and the synthetic paper strip is welded along its top lengthwise edge to the top edges of the first and second sheets. In preferred embodiments, the synthetic paper strip may be welded along its bottom lengthwise edge to the top edge of the third sheet, and the strip may also or alternatively be welded along its bottom edge to and between the first and second sheets.

According to another aspect of that invention, an album page is provided for holding flat items such as compact discs or photographs, comprising in combination: a flexible first sheet, a flexible second sheet, and a flexible third sheet interposed between the first and second sheets, the three sheets welded together to form at least one pocket between the first and third sheets including an opening in the first sheet for receiving a flat item in each of the at least one pocket, and to form at least one other pocket between the second and third sheets including an opening in the second sheet for receiving a flat item in each of the at least one other pocket; a synthetic paper strip interposed between and welded to the first and second sheets adjacent to the pockets; at least one window through the first sheet exposing at least one area of the synthetic paper strip in respective positional association with the at least one pocket; at least one window through the second sheet exposing at least one area of the synthetic paper strip in respective positional association with the at least one other pocket.

The windows through the first sheet are preferably in superposed relation with the windows through the second sheet, respectively. Weld-seals may be provided along the superposed windows, welding the synthetic paper strip to the first and second sheets along the superposed windows.

The present invention provides a sleeve or album page for holding or containing a compact disc such as a photo compact disc (i.e. a digital disc or CD containing digital photographic images) together with an index print on which are printed thumbnail-size graphic images of the digital information on the CD and in particular the digital photographs on the photo CD. Preferred embodiments of the device of the present invention include an embedded write-on strip of a synthetic paper strip interposed between and welded to the plastic sheets of which the device is constructed.

According to a principal aspect of the present invention, there is provided a sleeve or album page device having a width dimension and a height dimension for containing a compact disc and associated index print, comprising the combination of: two flexible plastic sheets in superposed relation and welded together forming a pocket between the sheets having an opening for receiving the disc and the index print; and two first welds within the pocket welding together the sheets, the first welds separated in the width dimension by a distance greater than one dimension (preferably the shorter dimension) of the index print but less than the diameter of the disc. The first welds are situated between the bottom of the pocket and a diameter of the disc when the disc is received in the pocket, such disc diameter being along the width dimension of the device. The separation between the first welds permits passage between such welds of a portion of the index print for positioning the index print in the pocket. The first welds may be spot welds, or they may be welds which extend along the height dimension of the device.

The preferred embodiment of the device of the present invention includes two second welds welding together the plastic sheets, such second welds being separated by a distance in the device's width dimension for permitting passage between such second welds of at least one half the disc when the disc is received by the pocket opening. The distance between the second welds is related to the diameter and thickness of the disc such that the disc resists withdrawal from within the pocket through the separation between the second welds when at least one half the disc has been received therethrough.

The first and second welds may be situated on an arc concentric with the disc, the radius of the arc being equal to or slightly larger than the radius of the disc.

The preferred embodiment of the sleeve or album page device of the present invention includes a write-on strip secured along an edge of the device. The write-on strip is preferably a synthetic paper strip interposed between and welded to the sheets, with a window through one of the sheets exposing an area of the synthetic paper strip for being written upon.

BRIEF DESCRIPTION OF THE DRAWINGS

The novel features believed to be characteristic of the invention, together with further advantages thereof, will be better understood from the following description considered in connection with the accompanying drawings in which preferred embodiments of the present invention are illustrated by way of example. It is to be expressly understood, however, that the drawings are for the purpose of illustration and description only and are not intended as a definition of the limits of the invention.

FIG. 1a is a front view of a preferred embodiment of a sleeve in accordance with the invention taught in U.S. Pat. No. 6,796,426 for holding two flat items, in particular two compact discs, .the rear view of this sleeve embodiment being substantially a mirror image of the front view;

FIG. 1b is a front view of a synthetic paper strip shown in FIG. 1a, the rear view being substantially a mirror image of the front view;

FIG. 2 is a cross-sectional schematic representation of the CD sleeve embodiment of FIG. 1a taken along the line 2-2 in the direction of the appended arrows;

FIG. 3 is a front view of a preferred embodiment of an album page for holding two flat items, in particular two photographs or other sheet material, the rear view of this album page embodiment being substantially a mirror image of the front view;

FIG. 4 is a cross-sectional schematic representation of the album page embodiment of FIG. 3 taken along the line 4-4 in the direction of the appended arrows;

FIG. 7 is a front view of an alternative embodiment of an album page similar to the embodiment of FIG. 4 but showing an alternative weld-seal configuration, the rear view of this album page embodiment being substantially a mirror image of the front view;

FIG. 8 is a cross-sectional schematic representation of the album page embodiment of FIG. 7 taken along the line 8-8 in the direction of the appended arrows;

FIG. 12 is a cross-sectional schematic representation of the device of FIG. 10 taken along the line 12-12 in the direction of the appended arrows;

FIG. 13 is a cross-sectional schematic representation of the device of FIG. 10 taken along the line 13-13 in the direction of the appended arrows; and FIG. 14 is a front view of a second preferred embodiment of the sleeve or album device of the present invention, showing a photo CD and an associated index print contained therein.

DETAILED DESCRIPTION OF THE PREFERRED EMODIMENTS

Figure 5:
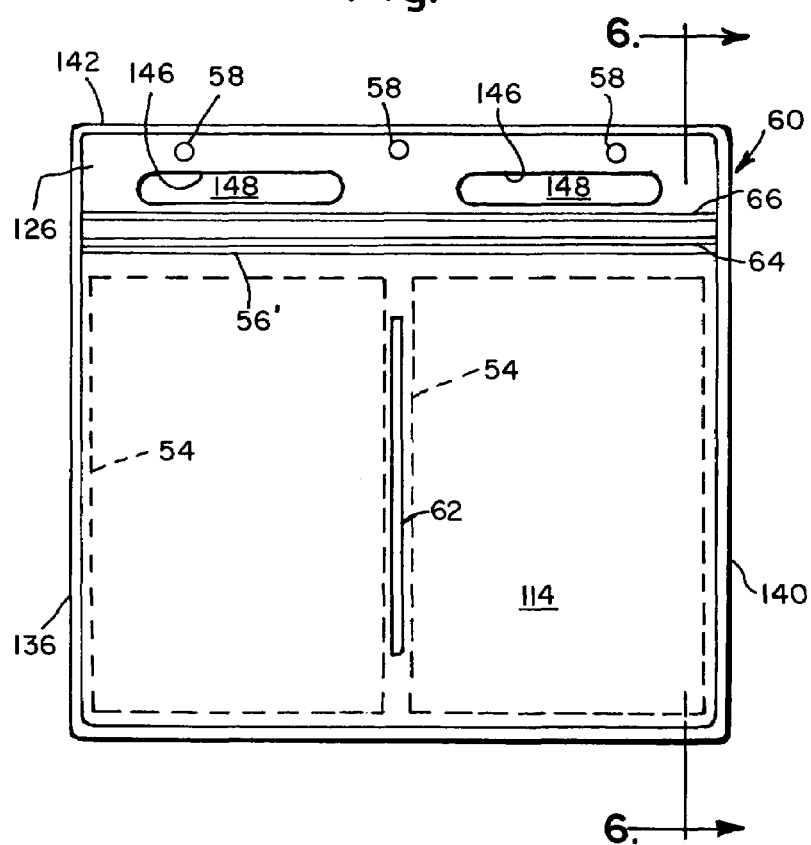
FIG. 5 is a front view of a preferred embodiment of an album page for holding four photographs or other flat items, in accordance with the present invention, the rear view of this album page embodiment being substantially a mirror image of the front view.

Turning first to FIGS. 1a, 1b and 2, there is shown a preferred embodiment of a sleeve 10, for holding two compact discs or CDs 12 (one of which is shown in FIG. 1 only). The CD sleeve 10 includes a first or front substantially rectangular, flexible, transparent plastic sheet 14, and a second or rear substantially rectangular, flexible, transparent plastic sheet 16, each preferably of a polyolefin material such as polypropylene. Both sheets 14 and 16 are of substantially the same height h (as viewed in the drawing of FIG. 1a) and of substantially the same width w. Interposed between the two transparent sheets 14, 16 is a sheet of non-woven material 18, preferably of a polyolefin material such as polypropylene, such as the single non-laminated sheet of non-woven material described in U.S. Pat. No. 6,186,320 (incorporated herein by reference) as having the trade name of VERATEC®, or the spunbond polypropylene manufactured by BB Nonwovens (of Simpsonville, S.C.) and marketed under the VERASPUN trademark.

The width of the non-woven material sheet 18 is substantially the same as the width w of the first and second transparent sheets 14, 16, and the height of the non-woven sheet 18 is slightly less than (for example by approximately one-half inch) the height h of the transparent sheets 14, 16 but slightly greater than the height dimension of the flat item, in this case such height dimension being the diameter of the CD 12. The three sheets 14, 18, 16 are situated in superposed relation with the non-woven sheet 18 sandwiched between the two transparent sheets 14, 16, and with the respective left edges (as viewed in the drawing of FIG. 1) of all three sheets in substantial alignment, the respective right edges of all three sheets in substantial alignment, and the respective bottom edges of all three sheets in substantial alignment, to respectively form a left edge 20 of the CD sleeve 10, a right edge 22 of the CD sleeve 10, and a bottom edge 24 of the CD sleeve 10. The three sheets 14, 18, 16, each being of thermoplastic material, are heat-welded along such edges as later described.

The write-on capability of the present invention is provided by a strip of synthetic paper upon which indicia may be applied by pen or pencil, and upon which indicia may be printed by conventional printing techniques such as silk screening. The term "synthetic paper" is used to identify a heat weldable sheet material that may be written or printed upon. One example of a synthetic paper comprises an opaque polyolefin-based synthetic paper, preferably consisting of polypropylene and filler material such as calcium carbonate, titanium dioxide and talc. Synthetic papers are well known in the art and commercially available, and one such type suitable for the present invention consists of approximately 60% polypropylene and 40% filler material. The polypropylene component permits heat-sealing, while the filler component permits the synthetic paper to be written upon.

The CD sleeve 10 includes a strip of such heat weldable synthetic paper 26 having a length which is substantially the same as the width w of each of the three sheets 14, 18, 16, and a height slightly greater than the difference between the height h of the sheets 14, 16 and the height of the non-woven sheet 18. As shown more clearly in FIG. 1b, the synthetic paper strip 26 includes a top lengthwise edge 28, a bottom lenthwise edge 32, a left edge or end 29, and a right edge or end 33. The synthetic paper strip 26 is interposed between the first and second transparent sheets 14, 16 such that the synthetic paper strip's top edge 28 is substantially aligned with the top edges of the transparent sheets 14, 16 (i.e. along the top edge 30 of the CD sleeve 10), and—in the embodiment where the strip 26 is greater than the difference between the height of the first sheet 14 and the height of the third sheet 18—with a lengthwise section adjacent to the strip's bottom edge 32 overlapping a corresponding widthwise section along the non-woven sheet's top edge 34.

The CD sleeve embodiment 10 is fabricated by using thermoplastic welding techniques to produce weld-seals welding together the three sheets 14, 18, 16 and the synthetic paper strip 26 as shown in FIGS. 1a and 2. Specifically, with the sheets 14, 18, 16 and strip 26 situated as previously described and shown, a left weld-seal 36 welds together the left edges of the sheets 14, 18, 16 and strip 26 to form the left edge 20 of the CD sleeve 10, a bottom weld-seal 38 welds together the bottom edges of sheets 14, 18, 16 to form the bottom edge 24 of the CD sleeve 10, a right weld-seal 40 welds together the right edges of the sheets 14, 18, 16 and strip 26 to form the right edge 22 of the CD sleeve 10, and a top weld-seal 42 welds together the top edges of the two transparent sheets 14, 16 and the top edge 28 of the synthetic paper strip 26 interposed between the two transparent sheets 14, 16 to form the top edge 30 of the CD sleeve 10. In the preferred embodiment of FIG. 1a, an intermediate weld-seal 44 welds together the first transparent sheet 14, the bottom lengthwise edge 32 of the synthetic paper strip 26, the top edge 34 of the non-woven sheet 18, and the second transparent sheet 16.

An opening or window 46 (see FIG. 1) through the front transparent sheet 14 between the top weld-seal 42 and the intermediate weld-seal 44 exposes an area 48 of the front surface of the synthetic paper strip 26. Similarly, another opening or window similar to the window 46 extends through the rear transparent sheet 16 between the top weld-seal 42 and the intermediate weld-seal 44, to expose an area of the reverse or rear surface of the synthetic paper 26 similar to the area 48. The two windows 46 through the two outer sheets 14, 16 are preferably in superposed relation. The synthetic paper strip 26 is held permanently captive between the two transparent sheets 14, 16 by the weld-seals 36, 42, 40, 44, and except for the exposed areas 48 within the windows 46 the strip 26 is embedded between the transparent sheets 14, 16. Additional securement of the strip 26 to the outer sheets 14, 16 in the vicinity of the window 46 may be provided by an additional weld on each side of the window, such as the two spaced-apart spot welds 49 along the strip 26 welding together the synthetic paper strip 26 and the first and second sheets 14, 16 on either side of the superposed windows 26. The exposed areas 48 on each surface of the synthetic paper strip 26 are accessible for being written or printed upon by ink, pencil or otherwise. The writing or message, if in pencil, may be erased for being again written or printed upon. The portions of the sheets 14, 16 covering the unexposed areas of the strip 26 protect such unexposed areas from damage and soilage.

A CD opening 50 downwardly extends from just below the horizontal intermediate weld-seal 44, extending across substantially the width w of the first transparent sheet 14, and permits a CD 12 to be inserted into the pocket formed between the first sheet 14 and the non-woven sheet 18, as shown in FIG. 1a. Similarly, a second CD opening 50' (see FIG. 2) through the second transparent sheet 16 permits another CD to be inserted into the pocket. formed between the second transparent sheet 16 and the non-woven sheet 18. Other configurations of the CD opening 50 are possible, many of which are known in the CD sleeve art.

The CD sleeve 10 may be fabricated by techniques well known in the plastics fabrication art. The weld-seals 36, 38, 40, 42, 44 are produced by well-known thermal welding techniques. Although other weld-compatible thermoplastic materials may be used, polypropylene is a preferred material for the transparent sheets 14, 16 as well as for the non-woven sheet 18 and the synthetic paper strip 26, and the weld-seals may be produced by such processes as conventional ultrasonic welding, or by thermocontact welding such as taught in U.S. Pat. No. 5,312,507 incorporated herein by reference. The creation of the windows 46 and of the CD pocket openings 50, 50', may be produced by punch or notching techniques well known in the plastics fabrication art.

The intermediate weld 44 is shown in FIG. 1 as being intermittent (i.e. a series of welded dashes) rather than as a solid or continuous seal, although a solid or continuous seal may alternatively be used for the intermediate weld-seal. Similarly, the solid or continuous weld-seals 36, 38, 40, 48 shown in FIG. 1 may alternatively be intermittent weld-seals.

In one example of a CD sleeve 10, the height h of the CD sleeve was approximately 5⅝ inches, the width w of the CD sleeve 10 was approximately 5 inches, the height of the non-woven sheet 18 was approximately 5⅛ inches, the height of the strip 26 was approximately ⅝ inch, and each window 46 was approximately 2½ inches in length and approximately ⅜ inches in height. In that example, the non-woven polypropylene sheet 18 was of 2.0-ounce weight, the synthetic paper strip 26 was 135-micron polypropylene-based, and each of two transparent sheets 14, 16 was 140-micron clear orange peel polypropylene.

FIGS. 3 and 4 show a first preferred embodiment of an album page 52 for holding two photographic prints 54, which album page is related in materials, structure and fabrication to the CD sleeve of FIG. 1. Accordingly, like reference numerals are employed in FIGS. 3 and 4 for like components in FIGS. 1 and 2; however, such like reference numerals in FIGS. 3 and 4 are augmented by 100 relative to their two-digit counterparts in FIGS. 1 and 2 (e.g., 126 instead of 26).

Accordingly, the album page 52 includes a first or front substantially rectangular, flexible, transparent plastic sheet 114, and a second or rear substantially rectangular, flexible, transparent plastic sheet 116, each preferably of a polyolefin material such as polypropylene. Both sheets 114 and 116 are of substantially the same height (as viewed in the drawing of FIG. 3) and of substantially the same width. Interposed between the two transparent sheets 114, 116 is a sheet of non-woven material 118 as previously described, preferably of a polyolefin such as polypropylene.

The width of the non-woven sheet 118 is substantially the same as the width of the first and second transparent sheets 114, 116, and the height of the non-woven sheet 118 is slightly less than the height of the transparent sheets 114, 116, but greater than the height of a photograph 54 (shown in phantom in FIG. 3, but not shown in FIG. 4) which each pocket of the double-sided album page 52 is to contain. The three sheets 114, 118, 116 are situated in superposed relation with the non-woven sheet 118 sandwiched between the two transparent sheets 114, 116, and with the respective left edges (as viewed in the drawing of FIG. 3) of all three sheets in substantial alignment, the respective right edges of all three sheets in substantial alignment, and the respective bottom edges of all three sheets in substantial alignment, to respectively form a left edge 120 of the album page 52, a right edge 122 of the album page 52, and a bottom edge 124 of the album page 52. The three sheets 114, 118, 116, each being of thermoplastic material, are heat-welded along such edges as previously described in connection with the fabrication of the CD sleeve 10.

Similarly to the structure of the CD sleeve 10, the album page 52 includes a strip of heat weldable synthetic paper having a write-on capability, as described above. The synthetic paper strip 126 has a length which is substantially the same as the width of the three sheets 114, 118, 116, and a height slightly greater than the difference between the height of the sheets 114, 116 and the height of the non-woven sheet 118. The synthetic paper strip 126 is interposed between the first and second transparent sheets 114, 116 such that the synthetic paper strip's top edge 128 is substantially aligned with the top edges of the transparent sheets 114, 116 (i.e. along the top edge 130 of the album page 52), and with a lengthwise section adjacent to the strip's bottom edge 132 overlapping a corresponding widthwise section along the non-woven sheet's top edge 134.

The album page 52 is fabricated by using thermoplastic welding techniques, as described above, to produce weld-seals welding together the various sheets 114, 118, 116 and the synthetic paper strip 126 as shown in FIGS. 3 and 4. Specifically, with the sheets 114, 118, 116 and strip 126 situated as previously described and shown, a left weld-seal 136 welds together the left edges of the sheets 114, 118, 116 and strip 126 to form the left edge 120 of the album page 52, a bottom weld-seal 138 welds together the bottom edges of sheets 114, 118, 116 and strip 126 to form the bottom edge 124 of the album page 52, a right weld-seal 140 welds together the right edges of the sheets 114, 118, 116 to form the right edge 122 of the album page 52, and a top weld-seal 142 welds together the top edges of the two transparent sheets 114, 116 and the top edge 128 of the synthetic paper strip 126 interposed between the two transparent sheets 114, 116 to form the top edge 130 of the album page 52. An intermediate weld-seal 144 welds together the first transparent sheet 114, the lengthwise section near the bottom edge 132 of the synthetic paper strip 126, the top edge 134 of the non-woven sheet 118, and the second transparent sheet 116.

An opening or window 146 (see FIG. 3) through the front transparent sheet 114 between the top weld-seal 142 and the intermediate weld-seal 144 exposes an area 148 of the front surface of the synthetic paper strip 126. Similarly, another opening or window similar to the window 146 extends through the rear transparent sheet 116 between the top weld-seal 142 and the intermediate weld-seal 144, to expose an area of the reverse or rear side of the synthetic paper strip 126 similar to the area 148. The synthetic paper strip 126 is held captive between the two transparent sheets 114, 116, by the weld-seals 136, 142, 140, 144, and except for the exposed areas 148 within the windows 146 the strip 126 is embedded between the transparent sheets 114, 116. The exposed areas 148 on each side of the synthetic paper strip 126 are accessible for being written or printed upon by ink, pencil or otherwise, such as a message relating to a photo print inserted in the corresponding pocket. If in pencil, the message may be erased for applying a different message as desired. The portions of the sheets 114, 116 covering the unexposed areas of the strip 126 protect such unexposed areas from damage and soilage.

An opening such as a slit 56 is cut through the first transparent sheet 114 for permitting a photograph 54 to be inserted through the slit opening 56 and into the pocket formed between the first sheet 114 and the non-woven sheet 118, as indicated in FIG. 3. The slit opening 56 may be situated just below the bottom edge 132 of the synthetic paper strip 126 and extend horizontally substantially the width of the first transparent sheet 114 as shown in FIG. 3 and schematically represented in FIG. 4, or the slit opening 56 may be vertically disposed for its loading of the photograph. Similarly, a second slit opening 56' (showed schematically in FIG. 4) through the rear transparent sheet 116 permits another photographic print to be inserted into the pocket formed between the second transparent sheet 116 and the non-woven sheet 118.

The album page 52 is adapted for being secured or held by a binder, such as by apertures spaced along one of the edges of the album page 52 for cooperation with rings of a loose-leaf album cover, for example by the apertures 58 through the two transparent sheets 114, 116 and the interposed synthetic paper strip 126 spaced along and adjacent to the album page's top edge 130. Similar provision may be implemented for adapting the CD sleeve 10 of FIG. 1 for being secured or held by a binder including a loose-leaf album cover.

It may be appreciated that, although the album page 52 is oriented in FIGS. 3 and 4 such that the synthetic paper strip 126 is shown along the page's top edge 130 (i.e. horizontally as viewed in the drawing of FIG. 3), in actual use the page may be rotated 90° in the plane of the drawing so that the synthetic paper strip 126 may be considered to be along a side edge (i.e. vertically as viewed in the drawing of FIG. 3) of the page 52 when held by an album cover or binder. Such appreciation applies as well to the album pages shown in FIGS. 5-8.

Figure 6:
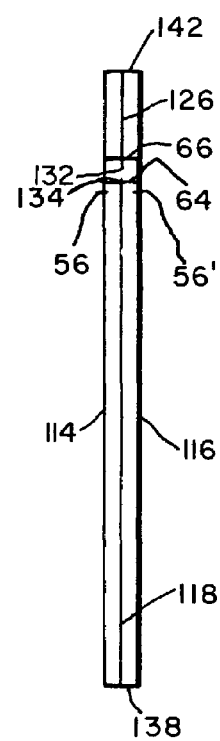
FIG. 6 is a cross-sectional schematic representation of the album page embodiment of FIG. 5, taken along the line 6-6 in the direction of the appended arrows.

FIGS. 5 and 6 show a second preferred embodiment of an album page 60 for holding four photographic prints 54, which album page is similar in materials and fabrication to the album page 52 of FIGS. 3 and 4, and except as described below is similar in structure to the album page of FIGS. 3 and 4. Accordingly, like reference numerals are employed in FIGS. 5 and 6 for like components in FIGS. 3 and 4.

The album page 60 includes two pockets between the first transparent sheet 114 and the non-woven sheet 118, each for holding a photographic print 54 (see FIG. 5) and separated by a vertical weld-seal 62 midway between the left and right edge weld-seals 136, 140, each pocket having an opening formed by the slit 56 horizontally situated just below the non-woven sheet's top edge 134 and the synthetic paper strip's bottom edge 132. Specifically, as shown in FIGS. 5 and 6, the slit opening 56 is situated just below the first intermediate weld-seal 64 welding the top edge 134 of the non-woven sheet 118 to the two transparent sheets 114, 116. In this embodiment, the height of the synthetic paper strip 126 is less than the difference between the height of the first sheet 114 and the height of the third sheet 118, so that the bottom lengthwise edge 132 of the strip 126 is not welded to the top edge of the third sheet 118 by the first intermediate weld-seal 64. Instead, the bottom lengthwise edge 132 of the synthetic paper strip 126 is welded to and between the two transparent sheets 114, 116 by a second intermediate weld-seal 66 parallel to and just above the first intermediate weld-seal 64 and spaced therefrom (such as by one-sixteenth inch). This dual intermediate weld-seal arrangement 64, 66 may be utilized as well for compact disc sleeves in accordance with the present invention; e.g. the embodiment of FIGS. 1 and 2 may be modified in accordance with the dual-intermediate weld-seal arrangement of FIGS. 5 and 6.

A second slit opening 56' (shown schematically in FIG. 6) through the second or rear transparent sheet 116 permits two additional photographic prints to be inserted into the two pockets separated by the weld-seal 62 and formed between the second transparent sheet 116 and the non-woven sheet 118.

Each of the four pockets has its own write-on area adjacent thereto, specifically a window 146 through the front transparent sheet 114 between the top weld-seal 142 and the second intermediate weld-seal 66, exposing respective areas 148 of the front surface of the synthetic paper strip 126 in positional association with the respective pockets. Similarly, other openings or windows similar to the window 146 extend through the rear transparent sheet 116 between the top weld-seal 142 and the second intermediate weld-seal 66, expose areas of the reverse or rear surface of the synthetic paper strip 126 similar to the areas 148 and respectively in positional association with the two pockets formed between the second transparent sheet 116 and the non-woven sheet 118. The synthetic paper strip 126 is held captive between the two transparent sheets 114, 116 by the weld-seals 136, 142, 140, 66, and except for the exposed areas 148 within the windows 146 the strip 126 is embedded between the transparent sheets 114, 116, such embedded areas being protected from damage and soilage. The exposed areas 148 on each side of the synthetic paper strip 126 are accessible for being written or printed upon by ink, pencil or otherwise.

A modification of the album page embodiment of FIGS. 5 and 6 is shown in FIGS. 7 and 8, in which the second intermediate weld-seal 66 of FIG. 5 does not extend across the entire width of the bottom edge 132 of the synthetic paper strip 126. Instead, in the album page embodiment 68 of FIGS. 7 and 8, sections of the synthetic paper strip 126 adjacent its bottom edge 132 are welded to and between the two transparent sheets 114, 116 by respective window weld-seals 70 extending along the bottom edge of each of the windows 146 and preferably extending about the entire perimeter of each of the windows 146. Such window weld-seals 70 are applicable as well to the compact disc sleeve embodiment of FIG. 1. In the preferred embodiments where a window through the first sheet is in superposed relation with a window through the second sheet, each weld-seal 70 welds the synthetic paper strip to the first and second sheets about both superposed windows.

In one example of a photographic album page 68, the non-woven polypropylene sheet 118 was of 2.0-ounce weight, the synthetic paper strip 126 was 135-micron white polypropylene, and each of the two transparent sheets 114, 116 was 115-micron clear polypropylene. Each of the pockets in this example was 4 3/16 inches in width and 6 1/8 inches in height, suitable for holding photo prints up to 4 inches by 6 inches in dimensions. Such dimensions and material properties are applicable as well to an example of the album page 60 of FIGS. 5 and 6.

FIGS. 9-14 illustrate preferred embodiments of the present invention, specifically a sleeve or album page device 200 for holding a compact disc 202—in particular a CD 202 containing digital photographic images (commonly referred to as a photo CD)—together with an index print 204 on which are printed thumbnail-sized graphic images 206 of the digital images on the photo CD. The preferred embodiment of the device 200 includes an embedded write-on strip in accordance with the teachings discussed above.

An increasingly popular service of commercial photofinishers is to provide their photographer customers with a photo CD 202 and an index print with such graphic images 206 corresponding to the digital images on the photo CD 202. The photo CD 202 and the associated index print 204 may be prepared using images on either rolls of exposed film from a photographic camera, or on digital memory media (such as a memory card or stick) from a digital camera or scanned from an image document, provided to the photofinisher by the customer. Alternatively, a consumer with access to a digital camera or scanner, a computer and printing apparatus may burn his or her own photo CD 202 and print a corresponding index print 204. The sleeve and album page device 200 of the present invention provides a mechanism for conveniently storing together and identifying the CD 202 and its corresponding index print 204.

Figure 10:
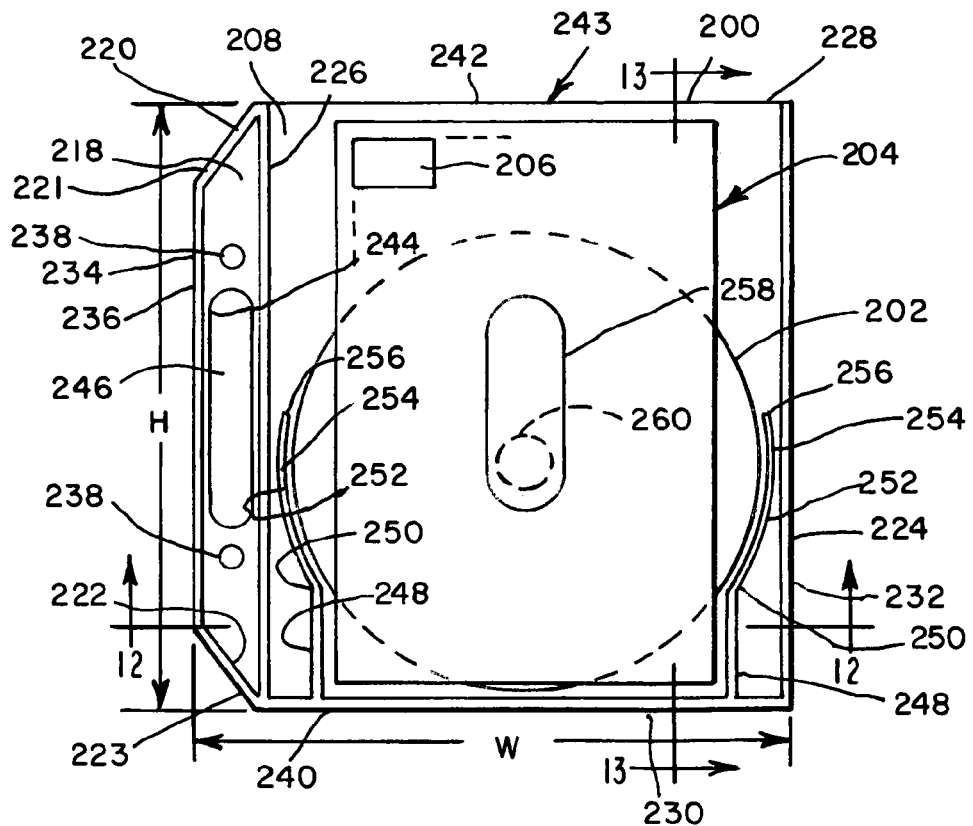
FIG. 10 is front view of a preferred embodiment of a sleeve or album page device in accordance with the present invention, in which a photo CD and an associated index print are shown contained therein.
Figure 9:
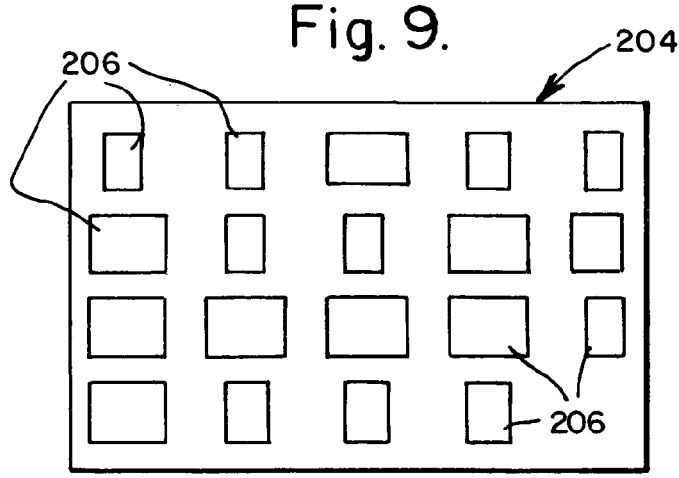
FIG. 9 is a front view of an example of an index print having printed thereon thumbnail-sized photographs of digital images on a photo CD.
Figure 11:
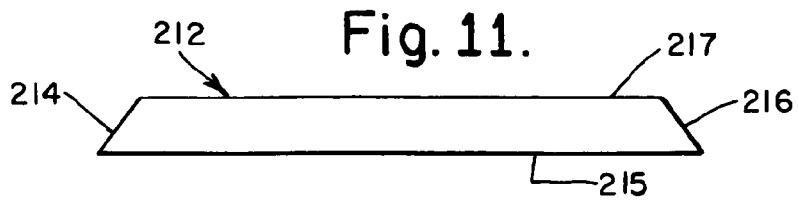
FIG. 11 is a front view of a synthetic paper strip shown in FIG. 10.

The preferred embodiment of the device 200, which is shown in FIG. 10 as an album page 200, includes a transparent first or front substantially rectangular, flexible plastic sheet 208, and a second or rear substantially rectangular, flexible plastic sheet 210. Both sheets 208, 210 are preferably of a polyolefin material such as polypropylene, while the preferred second sheet 210 is a non-woven type such as a single non-laminated sheet of non-woven material described in U.S. Pat. No. 6,186,320 (discussed above). Both sheets 208 and 210 are of substantially the same height H (as viewed in the drawing of FIG. 10) and of substantially the same width W.

The album page 200 includes a strip of heat-weldable synthetic paper 212, of a type similar to the synthetic paper strip 26 described above, for providing the write-on capability for the album page 200. In the preferred embodiment, the synthetic paper strip 212 (shown in FIG. 11) has a length which is preferably substantially the same as the height H of each of the two sheets 208, 210, although such synthetic paper strip's ends 214, 216 may be contoured to conform to the upper and lower edges of the first and second sheets 208, 210 in the vicinity of their left edges 232 (for example, as illustrated in FIG. 10). The synthetic paper strip 212 is interposed between and welded to the first and second sheets 208, 210, with the synthetic paper strip's lengthwise dimension directed along an edge of the device 200, such as along the superposed left edges 236 (as viewed in FIG. 10) of the sheets 208, 210.

The device 200 is fabricated by using thermoplastic welding techniques to produce weld seals welding together the two sheets 208, 210 and the interposed synthetic paper strip 212 as shown in FIGS. 10 and 12. Specifically, in the preferred embodiment, the sheets 208, 210 are welded together by a seam pattern which includes (as viewed in FIG. 10) a right vertical weld seam 224 and a first or inner left vertical weld seam 226 extending from the sheets' top or upper edges 228 to their bottom or lower edges 230, the right vertical seam 224 extending along the sheets' superposed right edges 232 horizontally spaced (i.e. along the width dimension of the device 200) from the first left vertical weld seam 226 by a distance at least as great as the diameter of the CD 202. A second or outer left vertical weld seam 234 along the sheets' superposed left edges 236 is horizontally spaced (i.e. along the width dimension of the device 200) from the first left vertical seam 226 by a distance for accommodating the width of the synthetic paper strip 212, thereby providing a tab or margin 218 enclosing the synthetic paper strip 212 and through which apertures 238 may be cut for permitting the device 200 to be retained as an album page such as by correspondingly positioned rings of a loose leaf binder or album.

A lower weld seam 240 preferably along the sheets' superposed lower edges 230, horizontally extends (i.e. along the width dimension of the device 200) from the right vertical weld seam 224 to the first left vertical weld seam 226. The upper edges 228 of the sheets 208, 210, extending from the right vertical weld seam 224 to the first left vertical weld seam 226, are not welded together, so that the weld seams 224, 226 and 240 form a pocket 243 between the two sheets 208, 210 with an opening 242 along the sheets' upper edges 228 for receiving the CD 202 and the index print 204. The height of the pocket 243 (i.e. the distance between the open upper edges 228 and the welded lower edges 230 or bottom of the pocket 243) is preferably at least great as the greater of the CD diameter and one dimension (preferably the longer dimension) of the index print.

During the fabrication process, the synthetic paper strip 212 is interposed between the two sheets 208, 210, within the margin 218, and the synthetic paper strip 212 is welded to the sheets 208, 210 within the margin 218. Preferably, the ends 214, 216 of the synthetic paper strip 212 are welded to the upper and lower edges 220, 222 of the margin 218 by respective weld seams 221, 223. In addition, or alternatively, the lengthwise edges 215, 217 of the synthetic paper strip 212 may be welded to the sheets 208, 210 such as by the first and second left vertical weld seams 226, 234, respectively. As shown in the preferred embodiment of FIG. 12, wherein the strip ends 214, 216 are welded by the weld seams 221, 223, the lengthwise edges 215, 217 need not be welded to the sheets 208, 210 by the first and second left vertical welds 226, 234 or otherwise.

A window 244 (FIGS. 10 and 12), through the transparent first sheet 208 between the first and second left vertical welds 226, 234, exposes an area 246 of the front surface of the synthetic paper strip 212. The synthetic paper strip 212 is held permanently captive between the two sheets 208, 210 by the margin upper and lower weld seams 221, 223 and/or the first and second left vertical weld seams 226, 234, and except for the exposed surface area 246 within the window 244, the strip 212 is embedded between the two sheets 208, 210. The exposed area 246 on the front surface of the synthetic paper strip 212 is accessible for being written or printed upon by ink, pencil or otherwise; the writing or message, if in pencil, may be erased so that the area 246 may again be written or printed upon. The portions of the sheets 208, 210 covering the unexposed areas of the strip 212 protect such unexposed areas from damage and soilage.

The two sheets 208, 210 are further welded together, within the pocket area, by two first positioning welds 248 separated in the width dimension by a distance greater than one dimension (preferably the short dimension) of the index print 204 but less than the diameter of the CD 202. The horizontal distance (as viewed in FIG. 10) between the two welds 248 is preferably slightly greater than the short dimension of the index print 204, so as to permit the index print 204 to be passed and positionally held between the two welds 248 and be fully received within the pocket 243. As noted above, the height of the pocket 243 is at least as great as the other dimension (preferably the long dimension) of the index print 204, so that the entire index print 204 is contained within the pocket 243 when the index print 204 is fully inserted through the pocket opening 242 while being positioned between the two welds 248.

In the preferred embodiment of the device 200 as shown in FIG. 10, the two welds 248 are vertical welds extending from the pocket's lower weld seam 240 to an upper terminus 250 of each weld located below the horizontal diameter of the CD 202 when fully inserted in the pocket 243, each upper terminus 250 preferably situated along a circular arc 252 concentric with and having a radius equal to or slightly greater than the radius of the CD 202 when the CD is fully received within the pocket 243.

FIG. 14 illustrates an alternative configuration of the welds 248, specifically two spot welds 248' welding together the two sheets 208, 210. The two spot welds 248' are situated along the respective circular arcs 252 (shown in phantom in FIG. 14) concentric with and having a radius equal to or slightly greater than the radius of the CD 202 when fully inserted in the pocket 243, i.e. the two spot welds 248' are situated at the same location as the termini 250 of the vertical welds 248 of FIG. 10.

Preferably, the device 200 includes two second positioning welds 254, for positioning the CD 202 within the pocket 243. In the preferred embodiment shown in FIG. 10, these second welds 254 are arcuate welds situated along an arc concentric with and having a radius equal to or slightly greater than the radius of the CD 202 when the CD is fully received within the pocket 243, such as the arc 252. The upper termini 256 of the arcuate welds 254 are located above the horizontal diameter of the CD 202 when the CD is fully inserted in the pocket.

Alternatively to the arcuate weld seams 254, the two second positional welds may be spot welds 254' shown in FIG. 14, situated at the position of the arcuate weld seam termini 256 of FIG. 10.

In either event, it is preferred that the horizontal distance between the two weld termini 256, or between the spot welds 254' permits passage therethrough of at least one-half the CD 202 when the CD is received in the pocket 243, and the distance between such termini 256 or spot welds 254' being related to the diameter and thickness of the CD 202 such that the CD 202 resists withdrawal from within the pocket 243 when at least one-half the disc 202 is received by the opening between the two weld termini 256 or the two spot welds 254'. Such weld structures 254, 254' are taught in U.S. Pat. No. 5,595,798, assigned to the assignee of the present invention, which patent is incorporated herein by reference.

The CD sleeve 200 may be fabricated by techniques well known in the plastics fabrication art, as described above in connection with fabrication of the CD sleeve 10. In addition, the welds of the device 200 may be either continuous or intermittent as previously described in connection with the CD sleeve 10.

In one example of the device 200 for holding a standard size CD of nominally 120 millimeter diameter (approximately 4.724 inches) and an index print 204 of nominally 4 inches by 6 inches, the height H of the device 200 was approximately 6¼ inches, the width W of the device 200 was approximately 6 inches, the height of each of the two first positional welds from the lower pocket weld seam 240 was approximately 1¼ inches and such welds 248 (or 248') were horizontally (i.e., in the width dimension) spaced apart from each other by a distance of approximately 4 3/16 inches, the distance between each of the two second positional weld termini 256 (or the spot welds 254') from the lower pocket weld seam 240 was approximately 3 inches, and the horizontal distance separating the two termini 256 (or the spot welds 254') was approximately 4 3/4 inches. In that example, the non-woven polypropylene sheet 210 was of 1.5 ounce weight, the transparent sheet 208 was 115 micron clear polypropylene, and the synthetic paper strip 212 was 135 micron polypropylene-based.

When using the device 200, the CD 202 is inserted into the pocket 243 through the opening 242 until its diameter passes through the opening between the weld termini 256 (or spot welds 254'), and the index print 204 is inserted in the pocket 243 through the opening 242 and between the two vertical second positional welds 248 (or the spot welds 248'). The index print 204 and the CD 202 are in superposed relation, preferably with the index print 204 between the CD 202 and the transparent front sheet 208, with the index print's graphic thumbnail images 206 visible through the transparent front sheet 208.

Indicia identifying the subject matter of the photographs in the CD 202 and on the index print 204 may be imprinted or written on the exposed surface of the write-on strip 212. If desired, the device 200 containing the CD and associated index print may be stored by inserting the same in an album upon utilization of the apertures 238 previously described.

The transparent front sheet 208 may be provided with an opening such as a slot 258 to afford access by a person to the CD's central aperture 206 when the CD 202 is contained in the pocket 243, for facilitating withdrawal of the CD 202 from the pocket 243 after removal of the index print 204.

Thus, there have been described preferred embodiments of sleeves and album page devices for holding flat items. In accordance with the present invention, there have been described preferred embodiments of such devices for holding a CD and an associated index print. A featured aspect of the disclosed embodiments includes an embedded synthetic paper strip with an exposed write-on area. Other embodiments of the present invention, and variations of the embodiments presented herein, may be developed without departing from the essential characteristics thereof. Accordingly, the invention should be limited only by the scope of the claims listed below.

We claim:

1. A device having a width dimension and a height dimension for containing a compact disc and an index print, comprising the combination of:
   a compact disc;
   an index print associated with said compact disc;
   two flexible plastic sheets in superposed relation and welded together forming a pocket between said sheets having an opening for receiving said disc and said index print; and
   two first welds within said pocket welding together said sheets, said first welds separated in said width dimension by a distance greater than one dimension of said index print but less than the diameter of said disc, said first welds situated between the bottom of said pocket and a diameter of said disc in said width dimension and at a distance from the center of said disc of at least the radius of said disc when said disc is received in said pocket.

2. The device according to claim 1, wherein:
   the separation between said first welds permit passage between said first welds of a portion of said index print for positioning said index print in said pocket.

3. The device according to claim 2, wherein:
   said first welds are spot welds.

4. The device according to claim 2, wherein:
   said first welds extend along said height dimension.

5. The device according to claim 1, including:
   a write-on strip secured along an edge of said device.

6. The device according to claim 1, including:
   a synthetic paper strip welded to said sheets.

7. The device according to claim 1, including:
   a synthetic paper strip interposed between and welded to said sheets; and
   a window through one of said sheets exposing an area of said synthetic paper strip.

8. The device according to claim 1, wherein:
   one of said sheets is transparent.

9. The device according to claim 8, wherein:
   the other one of said sheets comprises a sheet of non-woven material.

10. The device according to claim 9, including:
    a synthetic paper strip welded to said sheets.

11. The device according to claim 9, including:
    a synthetic paper strip interposed between and welded to said sheets; and
    a window through said one of said sheets exposing an area of said synthetic paper strip.

12. The device according to claim 1, including:
    two second welds welding together said sheets, said second welds separated by a distance in said width dimension for permitting passage between said second welds of at least one half said disc when the disc is received by said opening, said distance between said second welds being related to the diameter and thickness of said disc such that said disc resists withdrawal from within said pocket through the separation between said second welds when at least one half said disc is received therethrough.

13. The device according to claim 12, wherein:
    said first welds and said second welds are situated on an arc concentric with said disc when said disc is received in said pocket.

14. The device according to claim 13, wherein:
    said second welds extend along said arc to said first welds respectively.

15. The device according to claim 14, wherein:
    said first welds extend along said height dimension.

16. The device according to claim 12, including:
    a write-on strip secured along an edge of said device.

17. The device according to claim 12, including:
    a synthetic paper strip welded to said sheets.

18. The device according to claim 12, including:
    a synthetic paper strip interposed between and welded to said sheets; and
    a window through one of said sheets exposing an area of said synthetic paper strip.

* * * * *